United States Patent [19]

Cambier et al.

[11] Patent Number: 5,677,605
[45] Date of Patent: Oct. 14, 1997

[54] BRUSHLESS DC MOTOR USING PHASE TIMING ADVANCEMENT

[75] Inventors: Craig S. Cambier, Louisville; Jon F. Lutz, Westminster, both of Colo.

[73] Assignee: Unique Mobility, Inc., Golden, Colo.

[21] Appl. No.: 601,824

[22] Filed: Feb. 15, 1996

Related U.S. Application Data

[63] Continuation of Ser. No. 265,262, Jul. 1, 1994, abandoned, which is a continuation-in-part of Ser. No. 794,679, Nov. 19, 1991, abandoned, which is a continuation of Ser. No. 396,636, Aug. 22, 1989, abandoned.

[51] Int. Cl.$^6$ ............................................. H02P 6/08
[52] U.S. Cl. ................... 318/254; 318/439; 388/812
[58] Field of Search ............................... 318/138, 254, 318/439, 599, 608; 388/804, 805, 811, 812, 813, 819, 820, 829, 831

[56] References Cited

U.S. PATENT DOCUMENTS

| | | |
|---|---|---|
| 3,349,315 | 10/1967 | Studtmann. |
| 3,678,358 | 7/1972 | Kolatorowicz ............ 318/254 |
| 3,750,003 | 7/1973 | Petersen et al.. |
| 4,276,588 | 6/1981 | McLyman et al.. |
| 4,301,496 | 11/1981 | Schwarz ............ 363/132 |
| 4,546,293 | 10/1985 | Peterson et al.. |
| 4,585,986 | 4/1986 | Dyer. |
| 4,594,649 | 6/1986 | Rhoads et al.. |
| 4,594,650 | 6/1986 | Kinbara. |
| 4,608,527 | 8/1986 | Glennon et al.. |
| 4,626,715 | 12/1986 | Ishii ............ 307/571 |
| 4,742,208 | 5/1988 | Overman ............ 363/58 |
| 4,745,537 | 5/1988 | Cheung ............ 363/37 |
| 4,751,438 | 6/1988 | Markunas ............ 318/254 |
| 4,754,385 | 6/1988 | McDade et al. ............ 363/56 |
| 4,768,141 | 8/1988 | Hubertus et al. ............ 363/20 |
| 4,805,079 | 2/1989 | Van Buul ............ 363/56 |
| 4,835,448 | 5/1989 | Dishner et al.. |
| 4,926,302 | 5/1990 | Harada et al. ............ 363/16 |
| 4,937,725 | 6/1990 | Ohyanchand et al. ............ 363/56 |
| 5,192,887 | 3/1993 | Theis. |

FOREIGN PATENT DOCUMENTS

| | | |
|---|---|---|
| 0625369 | 9/1981 | France. |
| 3233204 | 3/1983 | Germany. |
| 3316251 | 11/1984 | Germany. |
| 0032525 | 3/1977 | Japan. |

OTHER PUBLICATIONS

Persson, E.K., Meshkat, S. "Brushless Servo System With Expanded Torque–Speed Operating Range," Motor–Con Proceedings, Apr. 1985 pp. 96–106.

*Primary Examiner*—Bentsu Ro
*Attorney, Agent, or Firm*—William A. Knoeller

[57] ABSTRACT

A drive system for a brushless DC motor uses pulse width modulation, and phase timing advancement to maintain a constant power output during high speed use. The arrangement is well suited for driving a brushless motor in an electric vehicle and the like.

4 Claims, 4 Drawing Sheets

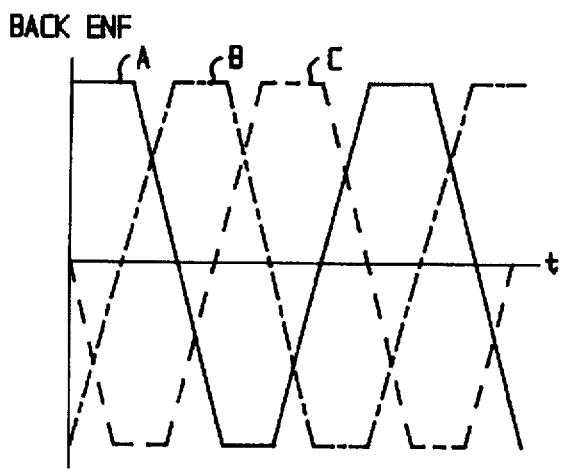
FIG. 4
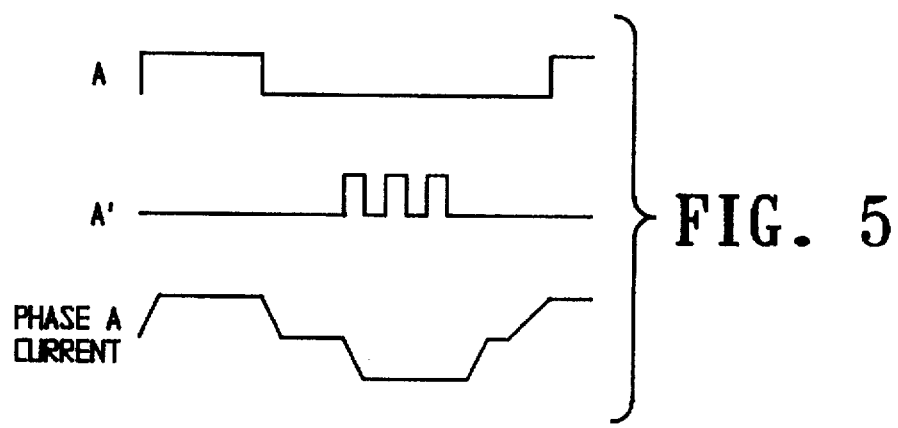
FIG. 5
FIG. 6
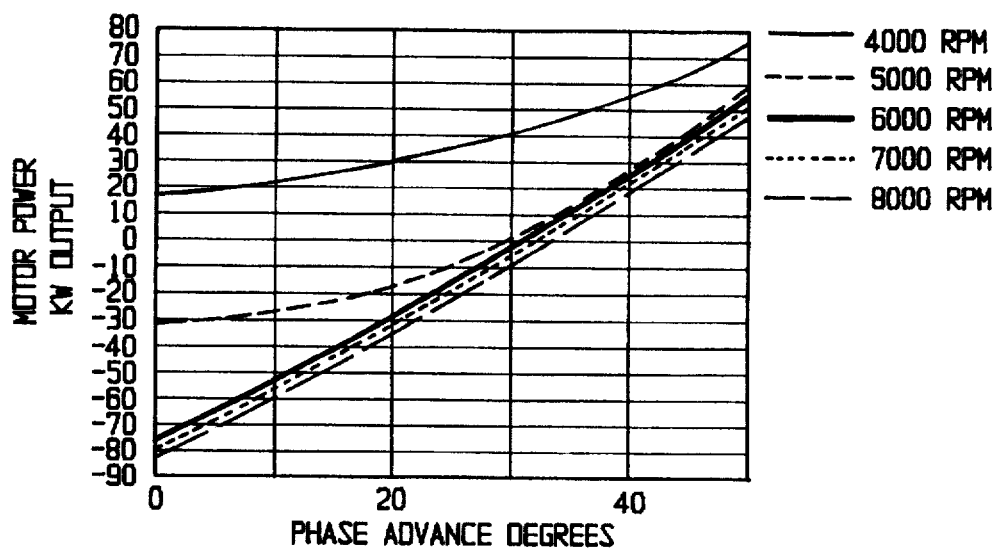

BRUSHLESS DC MOTOR USING PHASE TIMING ADVANCEMENT

This application is a Continuation of application Ser. No. 08/265,262, filed Jul. 1, 1994, abandoned; which is a Continuation-in-Part of application Ser. No. 07/794,679, filed Nov. 19, 1991, abandoned; which is a Continuation of application Ser. No. 07/396,636, filed Aug. 22, 1989, abandoned.

FIELD OF THE INVENTION

The present invention relates to motors in general, and in particular to brushless DC motors including phase timing advancement.

INTRODUCTION

Brushless DC motors are recognized as having the highest torque and power capability for a given size and weight. One of the reasons for this characteristic is due to the high field created, without loss, by the rare earth permanent magnets which generates relatively constant torque for a given current input to the motor winding. While this characteristic is very useful for many industrial applications, there are some applications that would benefit if the torque/current characteristic could be modified. This is particularly true for land vehicle drive systems.

Because many electric vehicles have limited power sources, there has been a long-felt need to have a motor that also has a constant power characteristic for maximization of its utility with a particular battery as well as minimization of the electronics necessary to drive it. The present invention provides a means to generate this desired characteristic with minimal cost impact on the original brushless DC drive system.

The recent concern over the quality of air in the US, Europe, and Japan has caused a flurry of activity in the areas of efficient electric drive systems for vehicles. While much of this activity is focused on the battery technologies, there is significant resources being spent on the improvement of other areas of vehicle systems to attain maximum performance from the presently limited battery technologies.

One area that is seen as being a significant contributor to a vehicle's efficiency is the drive system. The drive system, as envisioned for an electric vehicle, may include one or more electric motors, some form of mechanical gearing to the drive wheels, and an electronic control and power device for delivering power to the motor(s). There are many different motor technologies that can be used for this purpose, as well as a variety of electronic devices and control schemes for achieving the desired results.

The selection of a particular technology for a vehicle depends on several factors, including: cost, efficiency, size, weight, smoothness, etc. At this point in time, the main contenders for electric vehicle motors are the Asynchronous (induction) and Synchronous (permanent magnet) motors. Both of these motors require an electronic device that generates three phase AC waveforms of varying frequency and magnitude for the operation of the motor.

It is widely accepted that the permanent magnet brushless motor is capable of achieving higher efficiency and lighter weight than the induction motor, but the inherent characteristic of the permanent magnet brushless motor of constant torque for constant current is considered to be a drawback for applications in electric vehicles.

A typical vehicle requirement is to have a high value of starting torque for rapid acceleration of the vehicle as well as sufficient gradability for hilly terrain. On the high speed end, the vehicle needs less torque (or there is limited power available), but this is sufficient for cruising on normal road surfaces. These desired characteristics of electric vehicles fit well with a motor having a constant power characteristic.

There have been many papers written on the subject of motor control for the purpose of obtaining a constant power characteristic. Most of these papers make the assumption that the applied driving current or voltage is sinusoidal in nature and that the dominant effect of controlling the voltage and current is the positioning of the current in relative phase arrangement with the flux vector of the rotor such that the current flow causes a net flux reduction in the motor which allows constant power operation. While this method has been shown to produce good results and is well understood analytically, the present invention provides an alternative method which is much simpler in implementation and may offer a reduced cost to the above-described method.

SUMMARY OF THE INVENTION

Accordingly, an object of the present invention is to overcome the above-noted deficiencies. In particular, it is an object of the present invention to maintain constant power consumption during high speed use.

Another object of the present invention is to provide an overall reduction in the harmonic losses of the motor.

Another object of the present invention is to provide a system wherein no pulse width modulation losses occur in the upper speed operation region.

Another object of the present invention is to provide a system having system characteristics which closely match the vehicle and battery characteristics that it is associated with.

In accordance with the above, the present invention provides a brushless motor and drive system comprising:
 (a) a brushless DC motor comprising a stator having three phase windings, and a rotor, disposed in relation to said stator, having magnetic means formed thereon;
 (b) a detector for detecting a position of said rotor with respect to said stator and generating a position signal in response thereto;
 (c) a switching amplifier for selectively supplying current to respective ones of said phase windings in accordance with control signals;
 (d) means, receiving said position signal, for generating said control signals in accordance with said position signal, said means comprising a pulse width modulation means for generating said control signals.

Other features, advantages and objects of the invention will become apparent upon reviewing the Description of the Preferred Embodiment.

BRIEF DESCRIPTION OF THE DRAWINGS

FIG. 4 is a phase diagram illustrating the back EMF generated in the stator of the motor;

FIG. 5 illustrates a switching timing diagram for operation of the switching amplifier;

FIG. 6 is a graph illustrating the motor output power versus phase advance of the brushless motor at different speeds;

DESCRIPTION OF THE PREFERRED EMBODIMENTS

Figure 1:
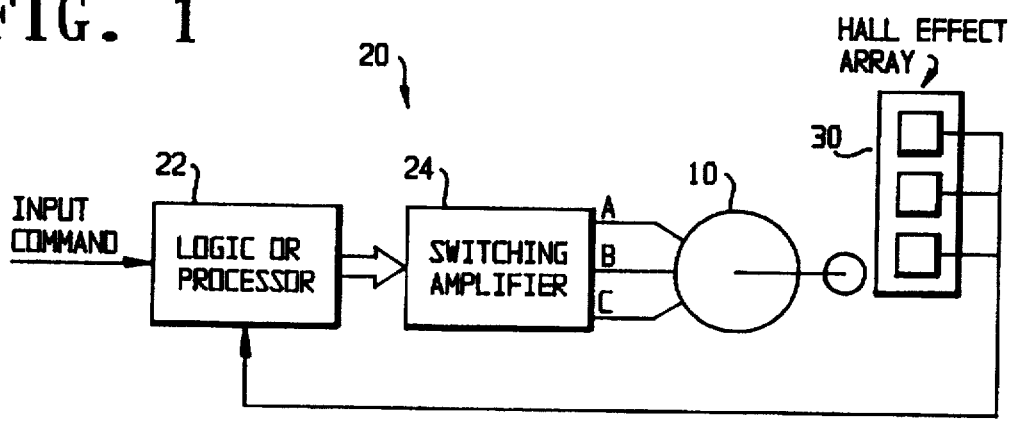
FIG. 1 illustrates a schematic view of the brushless motor and drive system of the present invention.

Referring to FIG. 1, the brushless motor system of the present invention comprises a three phase wound permanent magnet motor 10, a pulse width modulated three phase six step drive 20, and a rotor position sensor 30 of low resolution (such as an array of 3 digital Hall effect magnetic sensors) which outputs a position signal to drive 20. The drive 20 derives the commutation signal from the position signal. The drive 20 includes a logic or processor 22 including a pulse width modulator (PWM), a commutation controller and a circuit or a software routine internal to logic processor 22 which is capable of time shifting the position signals (commutation signal) feedback from the low resolution position sensor 30. The logic or processor 22, may comprise a hard wired circuit for generating the control signals, or may include a microprocessor device suitably programmed. The drive 20 also includes a switching amplifier 24, which is controlled by output from logic or processor 22, and selectively supplies current to various windings of motor 10. This arrangement is powered primarily from a source of DC voltage, which can be derived from a variety of means, including but not limited to a battery, rectified AC line voltage, rectified AC voltage from an alternator, voltage derived from a DC generator, voltage derived from a photovoltaic solar array, or any other electrical power source.

The rotor position sensor 30, operates to sense the magnetic field produced by the magnets of the motor. Alternately, a separate magnetic device may be associated with the rotor, and the sensor device 30 may sense this separate magnetic device which would generate similar magnetic positional information as the main motor rotor magnetic. Alternatively, the rotor position sensor may be of the digital optical sensing type, which senses a light source in accordance with an optical interrupter attached to the rotor.

In more detail, brushless motor 10 includes a stator 12 and a rotor 16. The stator includes three phase windings (wherein each phase is labeled A, B and C, respectively). The rotor includes permanent magnets 18 disposed around an axis thereof, for generating a magnetic flux. Preferably, the magnets may be surface mounted to the rotor, and may include Neodymium Iron Boron magnets. If the system is to be used at high temperature applications, the magnets may preferably be formed of Samarium cobalt. The rotor may include a solid steel rotating return path so as to provide low cost construction. Alternatively, the rotor may include a laminated ferromagnetic material rotating return path for lower rotor loss. Or, the rotor may comprise an amorphous magnetic material rotating return path for lower rotor loss.

Figure 3:
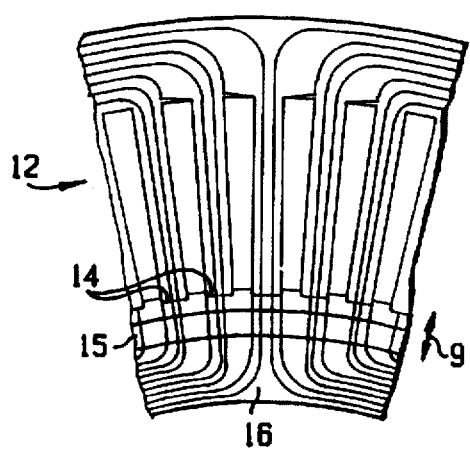
FIG. 3 illustrates the field distribution in the brushless DC motor of the present invention resulting from the permanent magnets of the rotor.

FIG. 3 illustrates the field distribution within motor 10 resulting from the field created by the permanent magnets of the rotor only. The drive system of the present invention may be used with an electric vehicle, for example having a single non-adjustable transmission for the purpose of reducing motor speed to desired wheel speed.

Referring to FIG. 3, stator 12 includes a plurality of teeth 14. Rotor 16 is separated from stator 12, by an air gap G. The rotor 16 has a surface mounted permanent magnetic 18 formed thereon. As is well understood in the art, when the rotor spins within the stator, a back electromagnetic force (EMF) is generated in the respective windings of stator 12. FIG. 4 illustrates the various back EMF's generated in each of windings A, B and C with respect to neutral. It is clear from FIG. 4, that back EMF tends to have a substantial sinusoidal shape.

Figure 2:
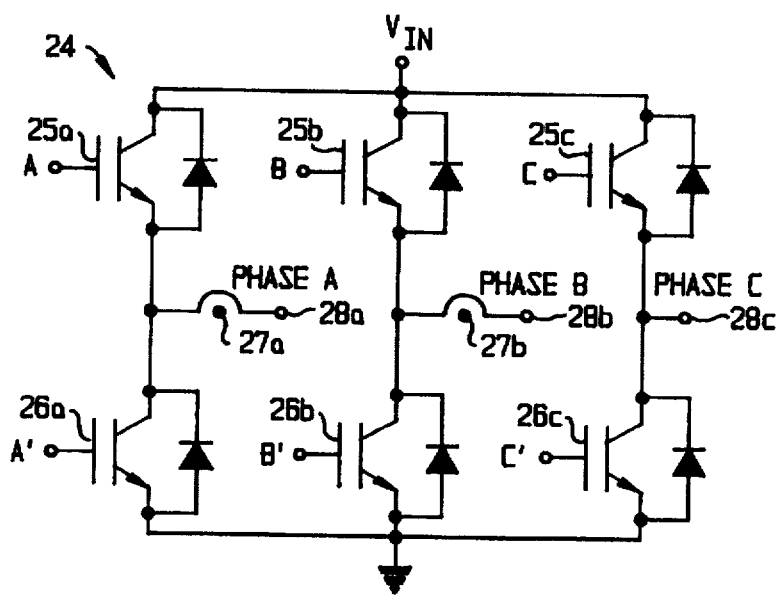
FIG. 2 illustrates a circuit diagram of the switching amplifier of the present invention.

FIG. 2 illustrates the switching arrangement of switching amplifier 24. Referring to FIG. 2, each of terminals A, B and C (and A', B' and C') receive switching control signals from logic or processor 22. Switching amplifier 24, includes a plurality of switching elements 25a, 25b and 25c; as well as switching elements 26a, 26b and 26c. $V_{in}$ represents the voltage input to switching amplifier 24. Preferably, switching elements 25a, 25b and 25c may be IGBT devices, and lower switches 26a, 26b and 26c may be MOSFET devices. Alternatively, all of the switches may be MOSFET's (for low voltage operation) or IGBT's, or any other suitable switching device. It is preferable to form the lower switches 26a, 26b and 26c of MOSFET devices so as to provide lower PWM switching losses at higher switching frequencies. The switching amplifier is connected to the respective windings of motor 10, via terminals 28a, 28b and 28c. Switching amplifier 24 includes current sensors 27a and 27b, which may be Hall effect type sensors.

The amplifier 24 may generate three phase AC rectangular waveforms rather than sinusoidal waveforms for the purpose of simple control and lower switching loss.

FIG. 5 illustrates an example of a switching arrangement for the switching amplifier. That is, when logic or processor 22 supplies input waveform A to terminal A, and input waveform A' to terminal A', the resultant current waveform supplied to the A winding is illustrated as phase A current. As is clear, the phase A current has a substantially sinusoidal shape, and is intentionally designed to parallel the wave form shape of the back EMF generated in the windings of the stator. The switching diagrams for the phase B and phase C arrangements, would be similar to FIG. 5, except out of phase therewith.

The philosophy in the architecture of the drive is to minimize system losses in all modes of operation. During low speed operation, which is defined as the condition when the back EMF of the permanent magnet motor 10 is less than the average DC input voltage from the power source, the drive functions such that a single one of the upper switches (25a, 25b, 25c) of the three phase bridge is on for ⅓ the electrical cycle (e.g. 120 degrees of the AC electrical characteristic) and one of the three lower switches (26a, 26b, 26c) is operating in a PWM mode during portions of this time. The net effect of this operation is the current is driven into one of the motor lines A, B, C (see FIG. 1) and returns to the amplifier through one of the other motor lines. The pattern changes with the relative position of the stator and rotor to form six separate patterns over the 360 degree electrical cycle of the motor, thus the name six step drive. During this time only one switch is subject to switching losses due to the PWM action which greatly reduces semiconductor losses, and the applied voltage to the motor remains essentially in phase with the position sensor alignment.

As the speed of the motor approaches the level where the generated back EMF is the same as the applied DC voltage, the ability of the amplifier to supply current into the motor diminishes which has the effect of torque reduction at this speed, and ultimately, speed limitation. At this condition, the PWM operation has reached 100% duty cycle which essentially removes all resultant losses in the amplifier and motor due to this effect, and the phase advance circuit or algorithm is invoked to "prematurely" turn on the desired upper or lower switch according to the requirements of the six step operation. The effect of this premature switching results in the application of the applied DC voltage to the motor winding when the value of AC voltage at the corresponding motor winding is less than this voltage. This results in a "precharging" of the winding with current when the position of the rotor is such that no significant torque is produced by this current flow. As the rotor rotates to the position where the generated back EMF has exceeded the applied DC voltage, the current in this winding has been raised to a level that significant torque is produced even though the current is now decreasing due to the negative relative voltage applied across the motor inductance. The result is that the speed range of a relatively standard brushless DC motor can be extended significantly to achieve the desired constant power characteristic without significant cost penalty.

FIG. 6 illustrates the various desired phase advance degrees in comparison to the motor output power, for various speeds of the rotor. Information indicative of this graph is preferably stored in logic or processor 22, and is used during the drive of the motor. As is clear from the graph, as the speed of the rotor increases, the motor output power, the phase advance degree curve becomes substantially linear.

Figure 7:
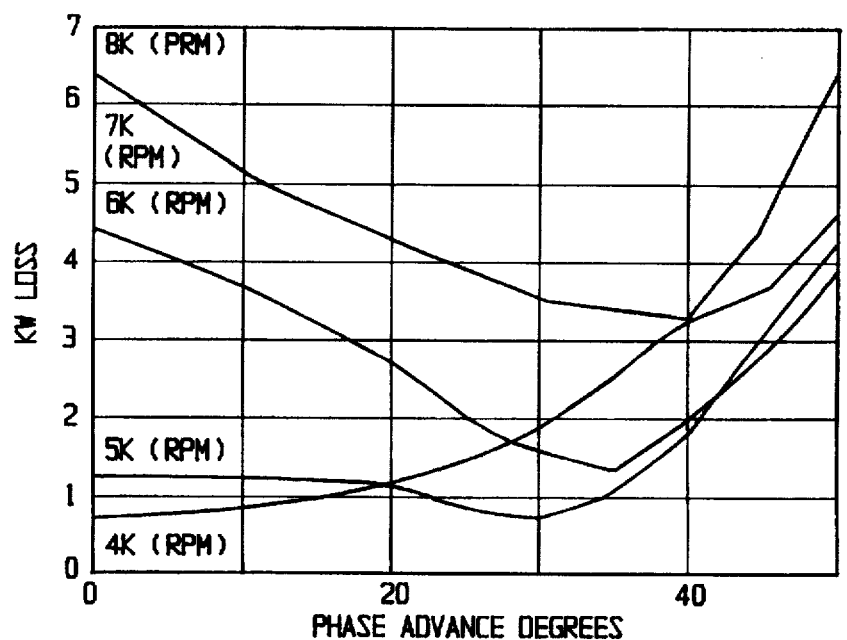
FIG. 7 is a graph illustrating the motor copper loss versus phase advance of the motor at different speeds.

However, as is clear from FIG. 7 which illustrates the rotor copper loss versus the phase angle for different speeds, some power loss does result in the windings. For example, referring to FIG. 6, to obtain a 40 kilowatt output at 4000 RPM, the phase advance angle of 30 degrees must be utilized. Now, referring to FIG. 7, it is clear that when a phase advance angle of 30 degrees is utilized at a rotator speed of 4000 RPM, approximately a 1.8 kilowatt loss results in the motor copper.

Figure 8:
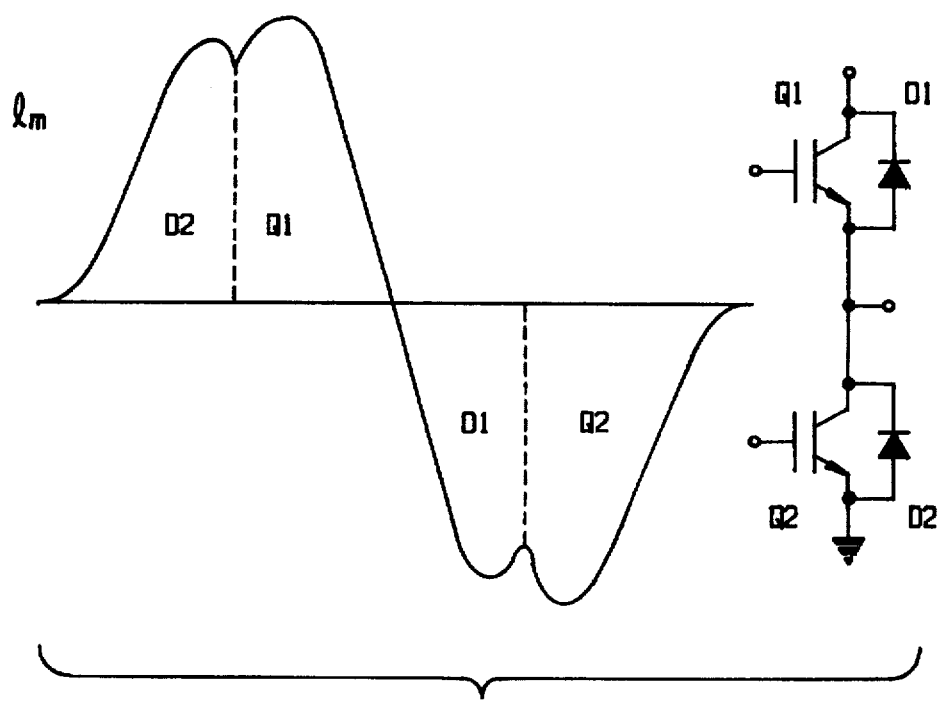
FIG. 8 illustrates the current conduction of the switching elements of the switching amplifier during phase advance.

FIG. 8 illustrates the interrelationship between the motor current and the switching on and off of the switching amplifier for a particular winding. Referring the graph, during the first portion of the current, the diode D2 is conducting, during the second portion thereof, the transistor Q1 is conducting. The lower half of the current graph is similarly explained.

Figure 9:
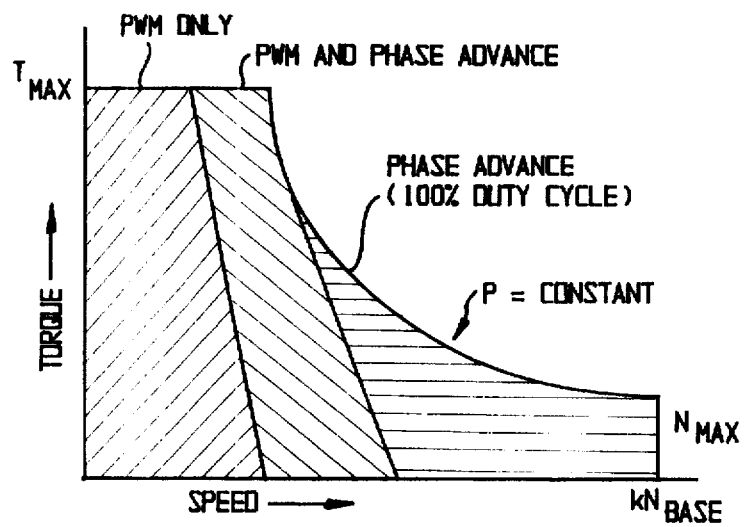
FIG. 9 is a graph illustrating the operation of the phase advance system.

FIG. 9 illustrates the operation of the phase advance system. Referring to the graph, $T_{max}$ represents the maximum torque, $N_{max}$ represents the maximum rotor speed for the permanent magnetic rotor, $N_{base}$ represents the rotor speed at which the back EMF equals the input voltage, and K is a constant which equals $N_{max}$ divided by $N_{base}$. Referring to FIG. 9, in the first speed region, the motor is operating in a pulse width modulation mode only; in the second region, the motor operates with pulse width modulation and phase advancement, and continues this operation until the pulse width modulation reaches 100 percent duty cycle. After that, in the third region, the torque reduces in a hyperbolic fashion, but the power remains constant throughout this region. Accordingly, the maximum speed may be reached at the same power.

Figure 10:
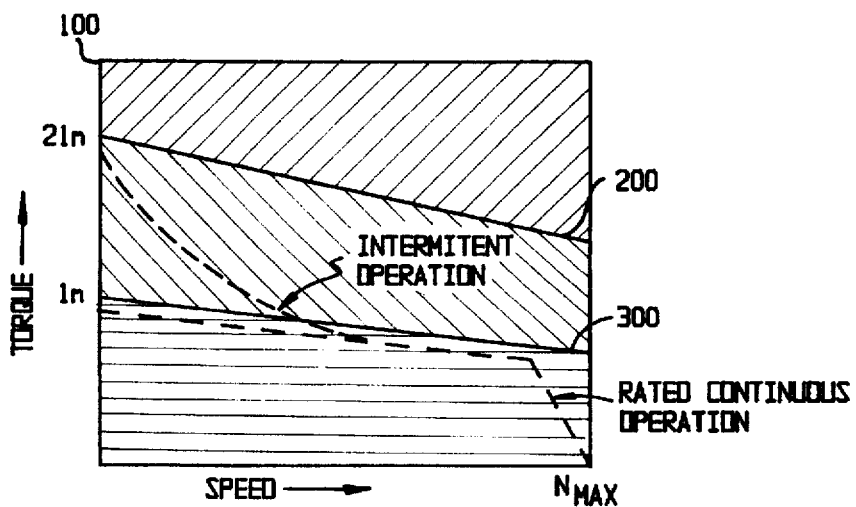
FIG. 10 illustrates the design points of the conventional drive arrangement.
Figure 11:
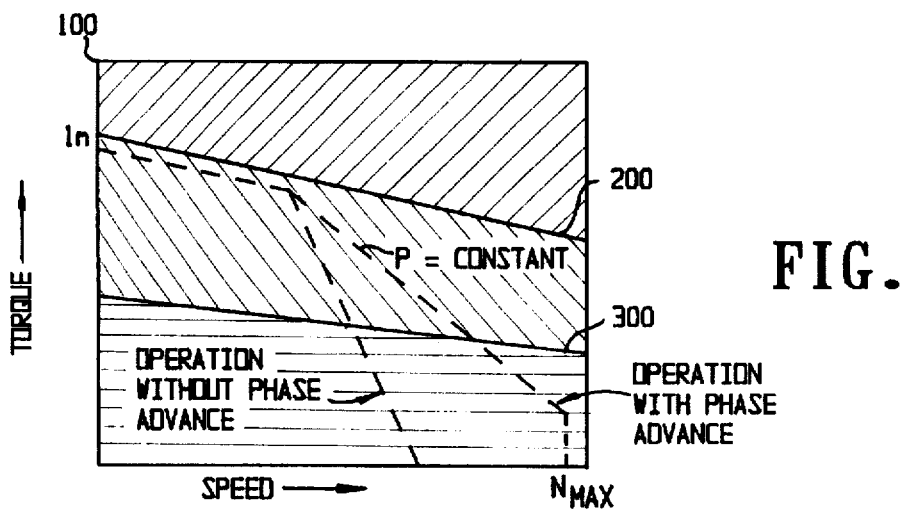
FIG. 11 illustrates that the design point of the phase advance drive of the present invention.

This provides for a great advantage over the conventional drive, which may best be illustrated with references to FIGS. 10 and 11.

FIG. 10 illustrates a design point of a conventional drive. In the figure, 100 designates the demagnetization limit of the motor, 200 represents the intermittent operation thermal limit, and 300 represents the continuous operation thermal limit. The dotted line in FIG. 10 illustrates the characteristic curve for the conventional drive. As is clear from the figure, if a current $I_m$ is required to operate the motor near the limit for continuous operation, practically double the current ($2I_m$) is required to reach the intermittent operation threshold.

In contrast, referring to FIG. 11, this figure illustrates the design point of the phase advance drive of the present invention. As is clear from the figure, the intermittent thermal limit can be reached by only supplying current $I_m$ to the motor. Furthermore, even as the speed of the motor increases, the power remains constant, even though the resultant torque is reduced.

The present invention using phase advance timing is more advantageous than field weakening systems.

In particular, the phase advance system of the present invention has many benefits over the field weakening system, such as the following:

1. The present invention may be used e.g. with a low cost low resolution rotor position sensor.
2. The present invention uses simple rotor design, having no saliency requirement or high armature reaction needed, which reduces rotor heating from non-fundamental electrical drive current components.
3. The present invention provides simple amplifier design, with greatly reduced losses due to PWM of only one of six switches during any given time and no PWM during constant power operation. Also, no generation of a sine wave is required because of low armature reaction, greatly simplifying the controller and allowing the use of a low resolution position sensor.

This technique is especially useful for dealing with motors of low (less than 1 mH) inductance.

Thus, in summary, the drive system of the present invention may comprise a permanent magnet DC motor, an electronic switching amplifier capable of generating three phase AC waveforms of varying frequency and amplitude, a low resolution sensor that is capable of measuring the relative position of the rotor to the motor stator to accomplish six step commutation of the motor, and a circuit or software algorithm that allows time adjustment of the commutation signal from the motor to the electronics for the purpose of implementing phase advance for constant power operation.

Having thereby described the subject matter of the present invention, it should be apparent that many substitutions, modifications, and variations of the present invention are possible in light of the above teachings.

What is claimed is:

1. A brushless motor and drive system comprising:
   (a) a brushless DC motor comprising a stator having three phase windings, and a rotor, disposed in relation to said stator, having magnetic means formed thereon;
   (b) a detector for detecting a position of said rotor with respect to said stator and generating a position signal in response thereto;
   (c) a switching amplifier for selectively supplying current to respective ones of said phase windings in accordance with control signals which define a motor current vector of said current; and
   (d) generating means, receiving said position signal, for generating said control signals in accordance with said position signal, said generating means comprising a pulse width modulation means for generating said control signals and phase advance means for phase advancing timings of said control signals by a phase advance mount, at a motor speed where back EMF is at least substantially equal to applied voltage, to advance said motor current vector beyond motor back EMF during at least one mode of operation, said phase advance amount being a function of a rotational speed and a desired output power of said brushless motor.

2. A brushless motor and drive system according to claim 1, wherein said switching amplifier comprises six switching elements arranged such that each phase winding of said motor has two switching elements associated therewith.

3. A brushless motor and drive system according to claim 1, wherein said phase advance means comprises means, operative during said at least one mode of operation, for selecting said phase advance amount in accordance with said rotational speed to maintain a constant value of said output power.

4. A brushless motor and drive system according to claim 1, wherein said position signal indicates said position of said rotor, said generating means generating said control signals in accordance with said position of said rotor.

* * * * *